US010381886B2

(12) United States Patent
Gieras et al.

(10) Patent No.: US 10,381,886 B2
(45) Date of Patent: Aug. 13, 2019

(54) MOTOR-GENERATOR WITH RADIAL-FLUX DOUBLE-SIDED STATOR

(71) Applicant: Hamilton Sundstrand Corporation, Charlotte, NC (US)

(72) Inventors: Jacek F. Gieras, Glastonbury, CT (US); Gregory I. Rozman, Rockford, IL (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 145 days.

(21) Appl. No.: 15/224,753

(22) Filed: Aug. 1, 2016

(65) Prior Publication Data

US 2018/0034353 A1    Feb. 1, 2018

(51) Int. Cl.
*H02K 1/14* (2006.01)
*H02K 7/02* (2006.01)
*H02K 21/48* (2006.01)
*H02K 16/02* (2006.01)
*H02K 21/12* (2006.01)

(52) U.S. Cl.
CPC ............ *H02K 1/146* (2013.01); *H02K 7/025* (2013.01); *H02K 16/02* (2013.01); *H02K 21/48* (2013.01); *H02K 21/12* (2013.01); *Y02E 60/16* (2013.01)

(58) Field of Classification Search
CPC ............................... H02K 21/22; H02K 1/146
USPC ........................................................ 310/74
See application file for complete search history.

(56) References Cited

U.S. PATENT DOCUMENTS

| 5,396,140 | A |   | 3/1995  | Goldie et al. |
| 5,568,023 | A | * | 10/1996 | Grayer ............... B60K 6/30 |
|           |   |   |         |                       180/165 |
| 5,907,199 | A |   | 5/1999  | Miller |
| 6,002,193 | A |   | 12/1999 | Canini et al. |
| 6,023,152 | A |   | 2/2000  | Briest et al. |
| 6,762,526 | B2|   | 7/2004  | Isozaki et al. |
| 6,828,710 | B1|   | 12/2004 | Gabrys |
| 7,659,686 | B2|   | 2/2010  | Osada et al. |
| 7,880,424 | B2|   | 2/2011  | Seguchi |

(Continued)

FOREIGN PATENT DOCUMENTS

| CA | 2612040    | 6/2008 |
| EP | 1565337 B1 | 8/2007 |

(Continued)

OTHER PUBLICATIONS

EP Patent Application No. 16202729 Extended EP Search Report dated Apr. 7, 2017, 6 pages.

(Continued)

*Primary Examiner* — Terrance L Kenerly
(74) *Attorney, Agent, or Firm* — Cantor Colburn LLP

(57) ABSTRACT

A motor-generator includes a double-sided stator having a first stator pole wound with a first stator winding of a first channel and a second stator pole wound with a second stator winding of a second channel. The first stator pole and the second stator pole are axially aligned with respect to a centerline of the motor-generator and radially offset between a radially inner side and a radially outer side of the double-sided stator. The motor-generator also includes at least one rotor radially disposed from the double-sided stator with respect to the centerline of the motor-generator.

13 Claims, 4 Drawing Sheets

(56) References Cited

U.S. PATENT DOCUMENTS

| | | |
|---|---|---|
| 8,030,787 B2 | 10/2011 | Kalev |
| 8,358,111 B2 | 1/2013 | Rozman et al. |
| 8,643,238 B2 | 2/2014 | Ling |
| 8,699,251 B2 | 4/2014 | Rozman et al. |
| 8,912,765 B2 | 12/2014 | Rozman et al. |
| 9,457,671 B2 * | 10/2016 | Manganaro ............. B60L 1/006 |
| 2008/0073995 A1 * | 3/2008 | Niguchi .................. H02K 29/03 310/216.001 |
| 2010/0244446 A1 * | 9/2010 | Qu ........................ H02K 7/1823 290/46 |
| 2012/0299401 A1 | 11/2012 | Prucher |
| 2012/0323427 A1 * | 12/2012 | Endo ...................... B60K 6/445 701/22 |
| 2013/0033136 A1 | 2/2013 | McMullen |
| 2013/0154449 A1 | 6/2013 | Shen |
| 2014/0191606 A1 | 7/2014 | Gieras et al. |
| 2017/0163114 A1 | 6/2017 | Gieras et al. |

FOREIGN PATENT DOCUMENTS

| | | |
|---|---|---|
| EP | 1931015 | 6/2008 |
| EP | 2133981 A2 | 12/2009 |

OTHER PUBLICATIONS

J. Oliveira, et al., "Power Balance Control in an AD/DC/AC Converter for Regenerative Braking in a Two-Voltage-Level Flywheel-Based Driveline," International Journal of Vehicular Technology, ID 934023, 2011, 10 pages.

S.S. Fagne, et al., "Experimental Set Up to Demonstrated Role of Flywheel for Increasing Battery Life of Electric Vehicles," International Journal of Engineering Research & Technology (IJERT), vol. 4 Issue 5, May 2015, 3 pages.

EP Application No. 17182918.7 Extended European Search Report dated Dec. 5, 2017, 8 pages.

* cited by examiner

MOTOR-GENERATOR WITH RADIAL-FLUX DOUBLE-SIDED STATOR

BACKGROUND

The subject matter disclosed herein relates to motor-generators, and more particularly, to a motor-generator with a double-sided stator configured as a radial-flux synchronous machine.

Flywheel energy storage systems can be used to store energy that may be typically wasted and release energy as needed. Flywheel energy storage systems may utilize supplemental energy storage to increase functionality of the storage system. Often, utilizing multiple sources of energy within a flywheel energy storage system may result in a motor-generator that is large, complex, and cost prohibitive.

BRIEF SUMMARY

According to an embodiment, a motor-generator includes a double-sided stator having a first stator pole wound with a first stator winding of a first channel and a second stator pole wound with a second stator winding of a second channel. The first stator pole and the second stator pole are axially aligned with respect to a centerline of the motor-generator and radially offset between a radially inner side and a radially outer side of the double-sided stator. The motor-generator also includes at least one rotor radially disposed from the double-sided stator with respect to the centerline of the motor-generator.

According to another embodiment, an energy storage system includes a flywheel and a motor-generator. The motor-generator includes a double-sided stator having a first stator pole wound with a first stator winding of a first channel and a second stator pole wound with a second stator winding of a second channel. The first stator pole and the second stator pole are axially aligned with respect to a centerline of the motor-generator and radially offset between a radially inner side and a radially outer side of the double-sided stator. The motor-generator also includes at least one rotor operably coupled to the flywheel. The at least one rotor is radially disposed from the double-sided stator with respect to the centerline of the motor-generator.

Technical effects of embodiments include a motor-generator with independently controllable channels having energy flow between the channels on opposite poles of a double-sided stator.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
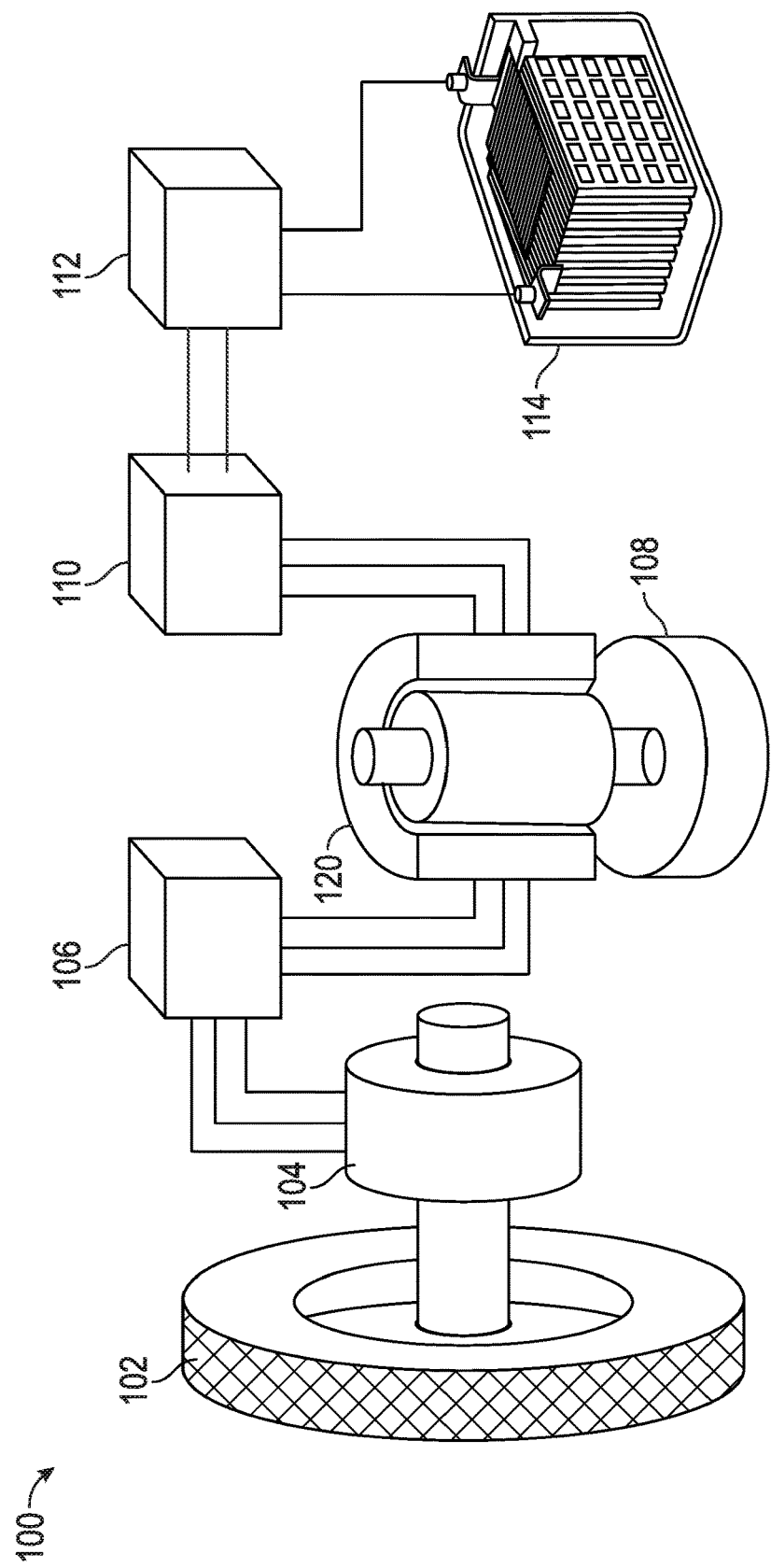
FIG. 1 is a schematic view of one embodiment of an energy storage system.
Figure 2:
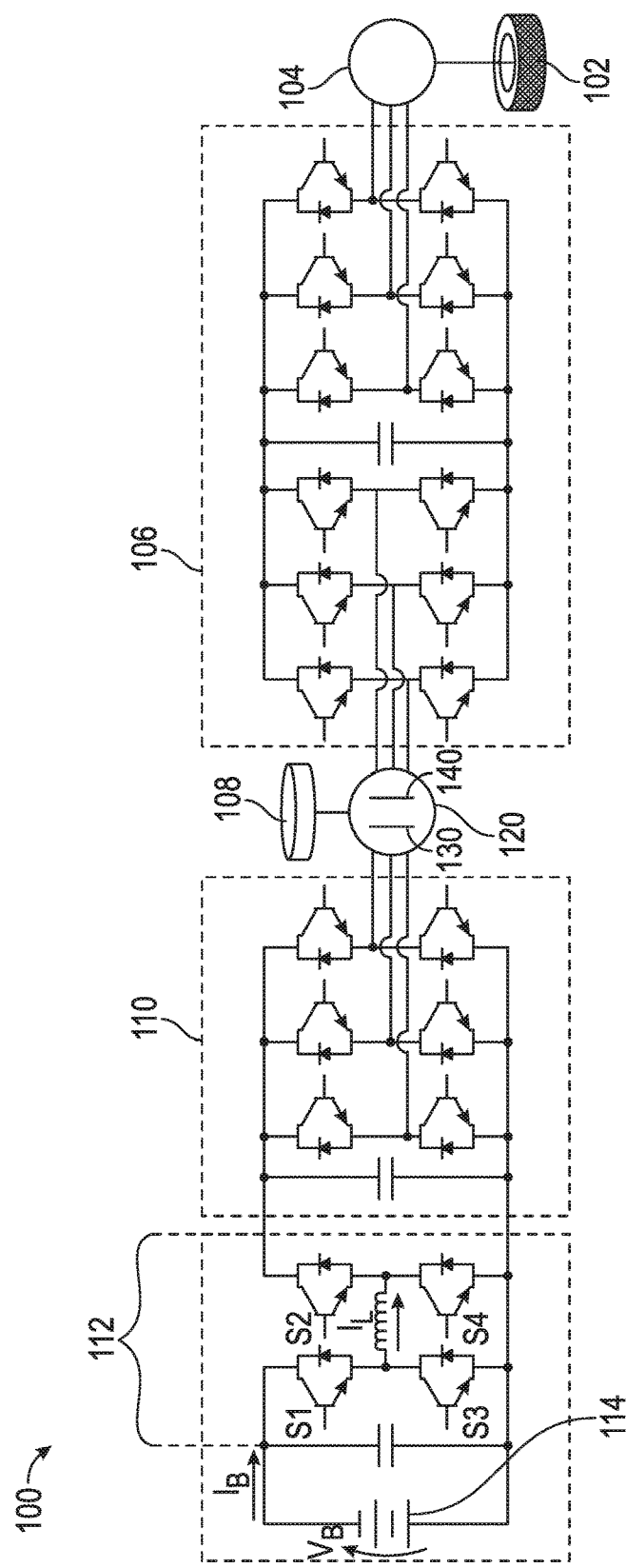
FIG. 2 is an electrical diagram view of the energy storage system of FIG. 1.

Referring now to the drawings, FIGS. 1 and 2 show an energy storage system 100. In the illustrated embodiment, the energy storage system 100 includes a wheel 102, a motor 104, a motor-generator 120, a flywheel 108, and a battery 114. In the illustrated embodiment, the energy storage system 100 can store energy from the wheel 102 and the battery 114, and release energy to the wheel 102 and the battery 114 to serve as an energy buffer to meet peak energy requirements. Advantageously, the energy storage system 100 can be used with vehicles to efficiently store and use energy and increase the battery life of the battery 114.

In the illustrated embodiment, the energy storage system 100 can provide and receive kinetic energy from the wheel 102. In other embodiments, the wheel 102 can be representative of any load that can provide and receive kinetic energy from the energy storage system 100. In the illustrated embodiment, the wheel 102 is driven by a wheel motor 104. Further, the wheel motor 104 can function as a generator to convert kinetic energy from the wheel 102 to electrical energy for use with the energy storage system 100. In certain embodiments, the wheel motor 104 can be a traction motor. In the illustrated embodiment, the wheel motor 104 is a high voltage motor. Further, the wheel motor 104 can be an AC permanent magnet synchronous motor. Advantageously, the wheel motor 104 can be high efficiency and provide high power density.

In the illustrated embodiment, the wheel motor 104 can be electrically connected to the motor-generator 120 via an AC/DC/AC converter 106. In certain embodiments, the AC/DC/AC converter 106 is a three-phase, four quadrant converter. In the illustrated embodiment, the AC/DC/AC converter 106 can facilitate bidirectional power transfer to the wheel 102 and from the wheel 102. During a drive mode, power flows to the wheel motor 104 and AC/DC/AC converter 106 operates as a rectifier at the motor-generator 120 side and as an inverter as the wheel motor 104 side as kinetic energy from the flywheel 108 is transferred as kinetic energy of the wheel 102. During braking or other regenerative operations, the AC/DC/AC converter 106 operates as a rectifier at the wheel motor 104 side and as an inverter at the motor-generator 120 side as kinetic energy from the wheel 102 is transferred to the flywheel 108 by facilitating generation operations of the wheel motor 104.

In the illustrated embodiment, the battery 114 can introduce stored chemical energy into the energy storage system 100. The battery 114 can further store and provide energy to the wheel 102. In certain embodiments, the battery 114 may provide energy, but may not provide adequate transient response for immediate power demands as may be required with certain applications, such as vehicles. Therefore, in certain embodiments, the battery 114 can provide energy to the flywheel 108 for use by the energy storage system 100 which may then be rapidly deployed as needed. In the illustrated embodiment, the battery 114 can be representative of any suitable energy source.

In the illustrated embodiment, the battery 114 is electrically connected to the motor-generator 120 via a bidirectional DC/DC converter 112 and a bidirectional AC/DC converter 110. In the illustrated embodiment, the DC/DC converter 112 controls output from the battery 114 to limit output current or alternatively boost battery 114 voltage.

Further, the DC/DC converter 112 can be utilized to recharge the battery 114 by using energy from the flywheel 108. In the illustrated embodiment, the AC/DC converter 110 can control the speed and torque of the flywheel 108 while the AC/DC converter functions as an inverter. Further, the AC/DC converter 110 can function as a rectifier as energy stored in the flywheel 108 is sent to the battery 114.

In the illustrated embodiment, the motor-generator 120 is connected to the flywheel 108 either directly, by a gearbox or by a linkage. The flywheel 108 can provide energy storage by storing and releasing kinetic energy to either the wheel motor 104 or the battery 114. The energy storage parameters of the flywheel 108 are determined by the moment of inertia and the rotational speed of the flywheel 108.

The motor-generator 120 can receive electrical energy from the wheel motor 104 and the battery 114 to provide kinetic energy to the flywheel 108. Further the motor-generator 120 can provide electrical energy to the wheel motor 104 and the battery 104 from the kinetic energy of the flywheel 108. As shown in FIG. 2, the motor-generator 120 can include a low voltage coil winding 130 and a high voltage coil winding 140 to allow electrical connections to both the low voltage/low power battery 114 and the high voltage/high power wheel motor 104 simultaneously. Advantageously, the motor-generator 120 can allow for the energy storage system 100 to operate at two voltage levels, similar to a traditional electrical transformer, by allowing energy to be introduced and removed by both the low voltage coil winding 130 and the high voltage coil winding 140. The motor-generator 120 can be used in any suitable application, including, but limited to vehicles such as hybrid or full electric vehicles.

In certain embodiments, the low voltage coil winding 130 may experience voltage ranging from 6 to 48 VDC after rectification. In certain embodiments, the low voltage coil winding 130 may experience any suitable DC voltage after rectification. In the illustrated embodiment, the low voltage coil winding 130 is formed from a material and geometry to be suitable for use with the expected voltage and power. In certain embodiments, the high voltage coil winding 140 may experience voltage ranging from 100 to 1000 VDC after rectification. In certain embodiments, the high voltage coil winding 140 may experience any suitable DC voltage after rectification. In the illustrated embodiment, the high voltage coil winding 140 is formed from a material and geometry to be suitable for use with the expected voltage and power.

Figure 3:
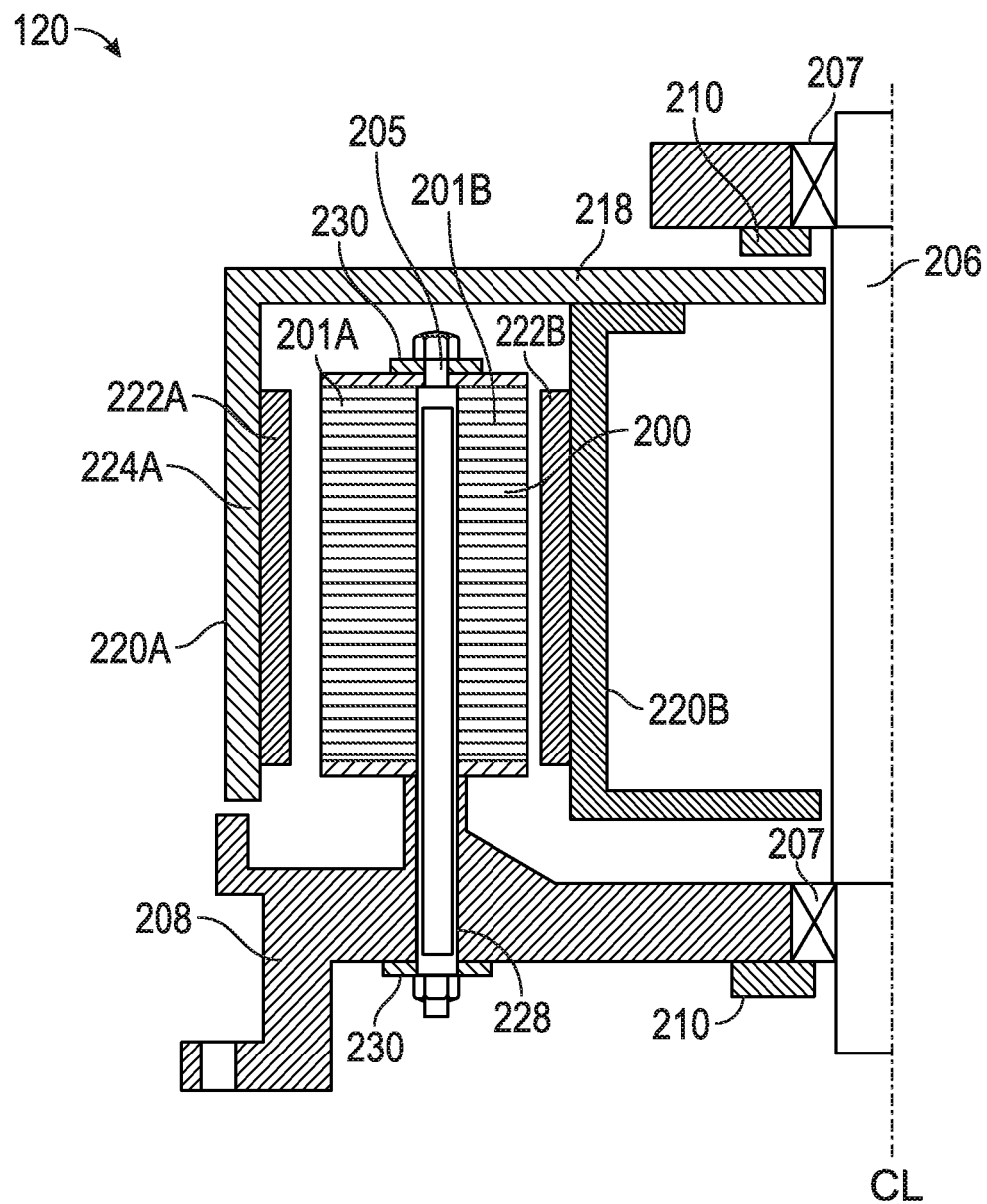
FIG. 3 is a cross sectional view of an axial portion of an embodiment of a motor-generator for use with the energy storage system of FIG. 1.
Figure 4:
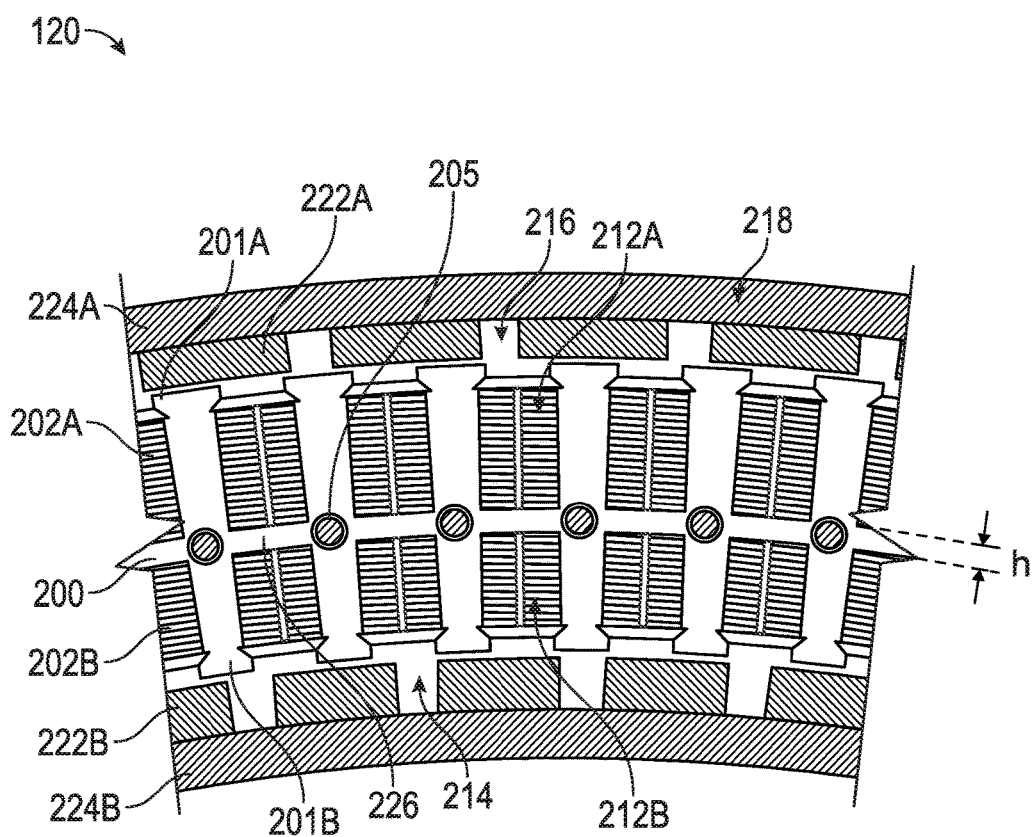
FIG. 4 is a cross sectional view of a radial portion of an embodiment of a motor-generator for use with the energy storage system of FIG. 1.

Referring to FIGS. 3 and 4 cross sections of the motor-generator 120 are shown according to an embodiment. In the illustrated embodiment, the motor-generator 120 includes a double-sided stator 200 with a first stator pole 201A wound with a first stator winding 202A of a first channel 212A and a second stator pole 201B wound with a second stator winding 202B of a second channel 212B, where the first stator pole 201A and the second stator pole 201B are axially aligned with respect to a centerline CL of a shaft 206 of the motor-generator 120 and radially offset between a radially inner side 214 and a radially outer side 216 of the double-sided stator 200. The first and the second channels 212A, 212B are independently controllable to supply or receive a same voltage or two different voltages. The first and second stator poles 201A, 201B can be salient poles characterized as having a relatively large diameter and a shorter axial length.

The motor-generator 120 is a radial-flux synchronous machine, where the first stator winding 202A and the second stator winding 202B are in magnetic communication. In certain embodiments, magnetic coupling between the first stator winding 202A and the second stator winding 202B functions as a transformer by facilitating a step up or step down of voltage via the magnetic coupling there between. Although the first stator winding 202A is depicted as radially outward of the second stator winding 202B, the designations can be reversed such that either the first stator winding 202A or the second stator winding 202B can be established as the low voltage coil winding 130 or the high voltage coil winding 140 of FIG. 2.

The motor-generator 120 also includes at least one rotor 218 radially disposed from the double-sided stator 200 with respect to the centerline CL of the motor-generator 120. The at least one rotor 218 includes a radially outer portion 220A disposed radially outward of the double-sided stator 200 and a radially inner portion 220B disposed radially inward of the double-sided stator 200 with respect to the centerline CL of the motor-generator 120. The radially outer portion 220A includes a first set of field generating elements 222A operable to establish electro-magnetic communication with the first channel 212A, and the radially inner portion 220B includes a second set of field generating elements 222B operable to establish electro-magnetic communication with the second channel 212B. The first and second sets of field generating elements 222A, 222B can be supported by rotor ferromagnetic cores 224A, 224B and implemented as permanent magnets or rotor field windings fed from brushless exciters (not depicted). Operating speed can be increased by controlling the motor-generator 120 in a field-weakening mode by varying a field current of an exciter that feeds either or both of the first and second sets of field generating elements 222A, 222B when rotor field windings are used.

The double-sided stator 200 includes a ferromagnetic yoke 226 including a plurality of pairs of the first stator pole 201A and the second stator pole 201B. The ferromagnetic yoke 226 is coupled to a stator housing 208 by a plurality of fasteners 205 that are electrically isolated from the ferromagnetic yoke 226, for instance, by an insulating tube 228 and insulating washers/end caps 230. To obtain good magnetic coupling between two coils belonging to two different opposite windings, sizing of the double-sided stator 200 is constrained. A radial dimension h (FIG. 4) is sufficiently small (e.g., a few millimeters) to obtain high magnetic saturation. The highly-saturated ferromagnetic yoke 226 of thickness h behaves as a non-ferromagnetic material. The relative magnetic permeability can be lower than 10, i.e., $\mu_r \leq 10$; otherwise, transformer action between a pair of the first stator winding 202A and the second stator winding 202B on opposite sides of the ferromagnetic yoke 226 can be deteriorated by leakage flux between neighboring poles of the ferromagnetic yoke 226.

One or more bearings 207 can support the shaft 206 that drives rotation of the at least one rotor 218 with respect to the stator housing 208. One or more bearing covers 210 can be installed proximate to the one or more bearings 207. In the illustrated embodiment, the at least one rotor 218 is coupled to the flywheel 108 (shown in FIG. 1) to send and receive kinetic energy therefrom. In certain embodiments, the mass of the at least one rotor 218 can be utilized or supplement the energy storage function of the flywheel 108. In certain embodiments, the at least one rotor 218 can be integrated with the flywheel 108. In other embodiments, the mass of the at least one rotor 218 can be utilized as the flywheel 108.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An energy storage system, comprising:
   a motor-generator, comprising:
   a double-sided stator comprising a first stator pole wound with a first stator winding of a first channel and a second stator pole wound with a second stator winding of a second channel, wherein the first stator pole and the second stator pole are axially aligned with respect to a centerline of the motor-generator and radially offset between a radially inner side and a radially outer side of the double-sided stator; and
   at least one rotor radially disposed from the double-sided stator with respect to the centerline of the motor-generator; and
   a flywheel operably coupled to the at least one rotor, the flywheel configured to store kinetic energy received as electric energy at the double-sided stator of the motor-generator,
   a wheel;
   a wheel motor coupled to the wheel; and
   a first power converter electrically connected to the wheel motor and the motor-generator,
   a second power converter electrically connected to the motor-generator; and
   a battery electrically connected to the second power converter,
   a third power converter electrically connected between the second power converter and the battery,
   wherein the first power converter is an alternating current (AC)/direct current (DC)/AC converter, the second power converter is an AC/DC converter, and the third power converter is a DC/DC converter,
   wherein the first power converter is a three-phase, four quadrant converter configured to facilitate bidirectional power transfer between the wheel motor and the motor-generator.

2. The energy storage system of claim 1, wherein the flywheel is integrally formed with the at least one rotor.

3. The energy storage system of claim 1, wherein the first and second stator poles are salient poles, the first stator winding is a first concentrated parameter stator winding, and the second stator winding is a second concentrated parameter stator winding.

4. The energy storage system of claim 1, wherein the first and the second channels are independently controllable to supply or receive a same voltage or two different voltages comprising a lower voltage and a higher voltage.

5. The energy storage system of claim 4, wherein a low-voltage coil winding of the motor-generator establishes an electrical connection with the lower voltage, and a high-voltage coil winding of the motor-generator establishes an electrical connection with the higher voltage.

6. The energy storage system of claim 1, wherein the first stator winding and the second stator winding are in magnetic communication.

7. The energy storage system of claim 1, wherein the double-sided stator comprises a ferromagnetic yoke comprising a plurality of pairs of the first stator pole and the second stator pole.

8. The energy storage system of claim 7, wherein the ferromagnetic yoke is coupled to a stator housing by a plurality of fasteners that are electrically isolated from the ferromagnetic yoke.

9. The energy storage system of claim 1, wherein the at least one rotor comprises a radially outer portion disposed radially outward of the double-sided stator and a radially inner portion disposed radially inward of the double-sided stator with respect to the centerline of the motor-generator.

10. The energy storage system of claim 1, wherein the radially outer portion comprises a first set of field generating elements operable to establish electro-magnetic communication with the first channel, and the radially inner portion comprises a second set of field generating elements operable to establish electro-magnetic communication with the second channel.

11. The energy storage system of claim 1, wherein the first power converter is electrically connected to the first channel and the second power converter is electrically connected to the second channel.

12. The energy storage system of claim 1, wherein the second power converter is operable to function as an inverter while controlling a speed and torque of the flywheel, and the second power converter is operable to function as a rectifier while transferring energy stored in the flywheel to the battery.

13. The energy storage system of claim 12, wherein the third power converter is operable to recharge the battery using energy from the flywheel, and the third power converter is operable to limit or boost an output of the battery.

* * * * *